(12) United States Patent
Dayal et al.

(10) Patent No.: US 10,898,789 B2
(45) Date of Patent: Jan. 26, 2021

(54) SYSTEM AND METHOD FOR DIGITALLY CONNECTING A NETWORK OF PHYSICAL GAMES

(71) Applicant: ThrowMotion, Inc., Sunnyvale, CA (US)

(72) Inventors: Aditya Dayal, Sunnyvale, CA (US); Alex Hayashi, Cupertino, CA (US); Vishaal Prasad, Union City, CA (US); Shreerag Jayakrishnan, Irvine, CA (US); Maisem J. Ali, Kirkland, WA (US)

(73) Assignee: THROWMOTION INC., Sunnyvale, CA (US)

( * ) Notice: Subject to any disclaimer, the term of this patent is extended or adjusted under 35 U.S.C. 154(b) by 0 days.

(21) Appl. No.: 15/961,476

(22) Filed: Apr. 24, 2018

(65) Prior Publication Data

US 2018/0304146 A1    Oct. 25, 2018

Related U.S. Application Data

(60) Provisional application No. 62/489,357, filed on Apr. 24, 2017.

(51) Int. Cl.
| | |
|---|---|
| *A63F 9/24* | (2006.01) |
| *A63F 11/00* | (2006.01) |
| *G06F 13/00* | (2006.01) |
| *G06F 17/00* | (2019.01) |
| *A63F 7/30* | (2006.01) |
| *H04N 21/81* | (2011.01) |
| *G07F 17/38* | (2006.01) |
| *G06Q 50/34* | (2012.01) |
| *A63F 7/06* | (2006.01) |
| *G07F 17/32* | (2006.01) |
| *G06Q 50/00* | (2012.01) |

(52) U.S. Cl.
CPC ............ *A63F 7/307* (2013.01); *A63F 7/0616* (2013.01); *G06Q 50/34* (2013.01); *G07F 17/3288* (2013.01); *G07F 17/38* (2013.01); *H04N 21/8126* (2013.01); *A63F 2009/2435* (2013.01); *A63F 2009/2442* (2013.01); *A63F 2009/2444* (2013.01); *A63F 2009/2485* (2013.01); *G06Q 50/01* (2013.01)

(58) Field of Classification Search
USPC ...... 273/273, 292; 463/1, 20, 22, 25, 39, 40, 463/42
See application file for complete search history.

(56) References Cited

U.S. PATENT DOCUMENTS

| | | | |
|---|---|---|---|
| 10,089,816 B2* | 10/2018 | Pagano .................... | G07F 17/32 |
| 2004/0214623 A1* | 10/2004 | Takahashi ............... | A63F 13/10 |
| | | | 463/2 |
| 2005/0127601 A1* | 6/2005 | Giegerich ................. | A63F 7/06 |
| | | | 273/108.1 |

(Continued)

*Primary Examiner* — Adetokunbo O Torimiro
(74) *Attorney, Agent, or Firm* — Goodwin Procter LLP

(57) ABSTRACT

A system and method for digitally connecting a network of physical games are disclosed. According to one embodiment, a system comprises a table game having a first goal. A first sensor is inside first the goal. The system has a microcontroller in communication with the first sensor that collects first data. A computing device is in communication with the microcontroller that detects when a ball has entered the first goal.

20 Claims, 12 Drawing Sheets

(56) References Cited

U.S. PATENT DOCUMENTS

| | | | |
|---|---|---|---|
| 2006/0119030 A1* | 6/2006 | Simon | A63F 7/0672 273/108.52 |
| 2007/0001396 A1* | 1/2007 | Walker | G07F 17/32 273/292 |
| 2015/0332552 A1* | 11/2015 | Chun | G07F 17/3265 463/25 |
| 2017/0301179 A1* | 10/2017 | Palenzuela | G07F 17/3213 |

* cited by examiner

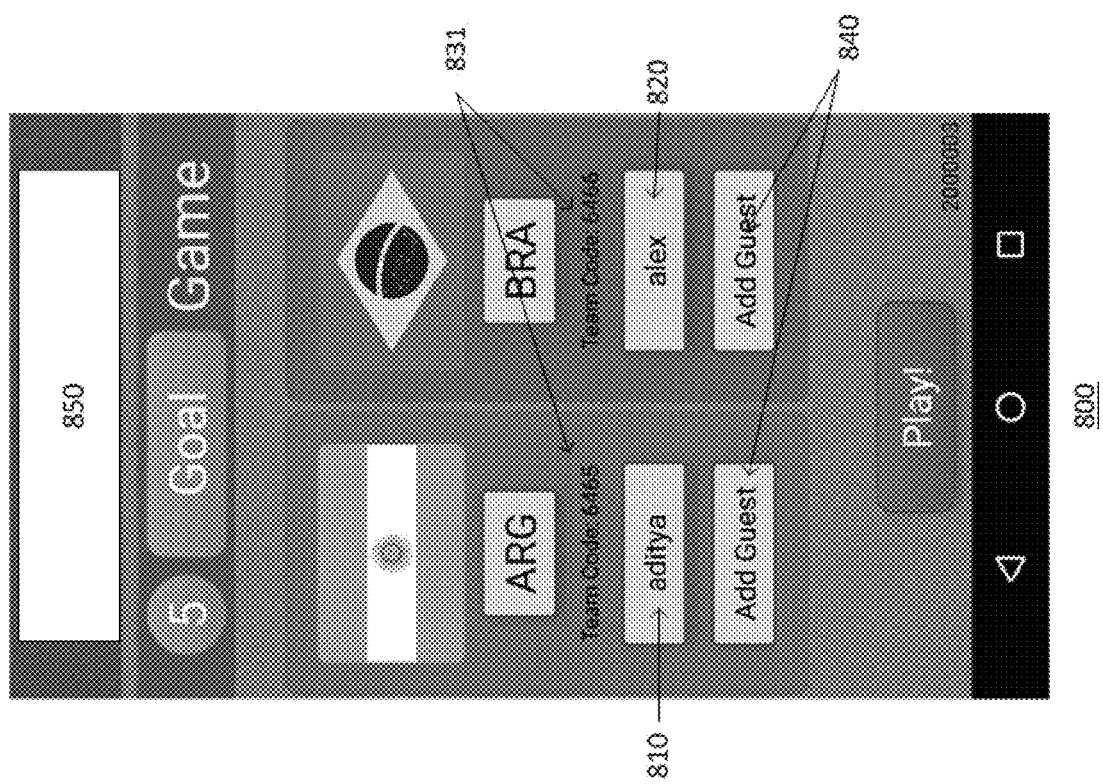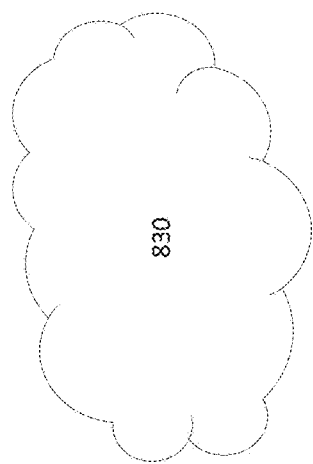
Figure 8

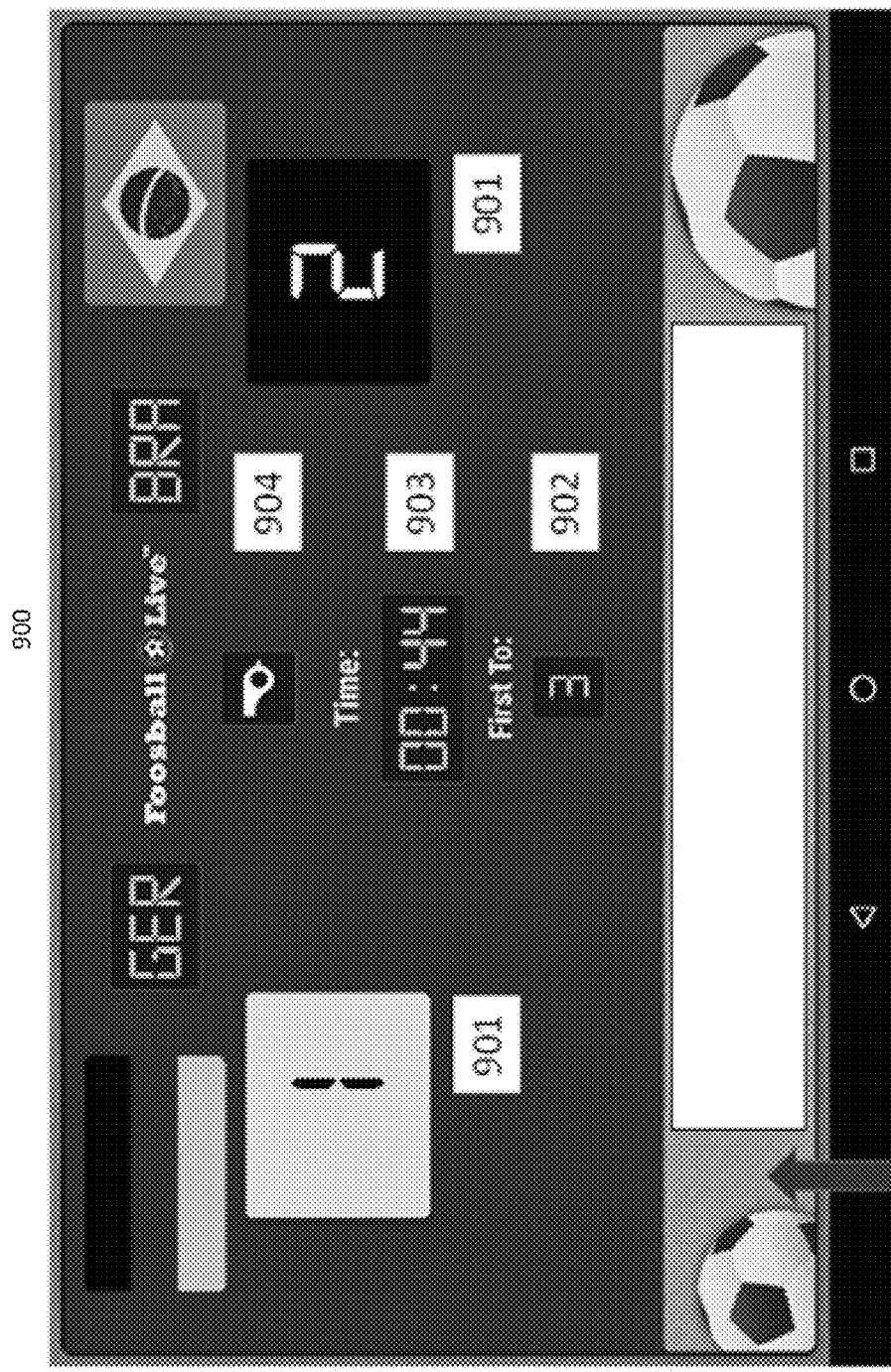
Figure 9

SYSTEM AND METHOD FOR DIGITALLY CONNECTING A NETWORK OF PHYSICAL GAMES

CROSS-REFERENCE TO RELATED APPLICATIONS

The present application claims the benefit of U.S. Provisional Application No. 62/489,357, filed Apr. 24, 2017, entitled "System and Method for Digitally Connecting a Network of Physical Games" which is herein incorporated by reference in its entirety.

TECHNICAL FIELD

The present application relates generally to computing device networking and in particular, a system and method for digitally connecting a network of physical games.

BACKGROUND

Conventional table games such as foosball (table football) tables are not connected to the internet and generally there is no automatic goal/scoring detection capability. Scores may be kept via sliding beads or markers or recorded via pen and paper. Tournament results, leader boards, and player standings may be made available on the internet by manually entering results of games. There is no easy way to make the play-by-play outcomes, goal updates, or match results available to the larger community or audience beyond the table. There is also no way to influence players' behavior, for example, such as real-time incentives, or provide additional game types, which is possible in web-connected games.

In conventional table games, recording game results and computing statistics manually is time consuming and may be subject to human error.

SUMMARY

A system and method for automatically detecting key events, such as goals being scored, and digitally connecting physical games to a network is disclosed. According to one embodiment, it is possible for real-time, bi-directional communication to occur with each game table. According to one embodiment, a system comprises a table game having a first goal, having a first emitter inside the first goal and a first sensor inside first the goal. According to one embodiment, the system has a microcontroller, in communication with the first emitter and first sensor, which collects and communicates data. According to one embodiment, a computing device is in communication with the microcontroller, which detects when a ball has entered the first goal, and communicates that information to the computing device.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTION OF THE DRAWINGS

The accompanying drawings, which are included as part of the present specification, illustrate the presently preferred embodiment of the present invention and together with the general description given above and the detailed description of the preferred embodiment given below serve to explain and teach the principles of the present invention.

FIG. 8 is an exemplary user interface illustrating a match setup screen, according to one embodiment.

FIG. 9 is an exemplary user interface illustrating an exemplary scoreboard, according to one embodiment.

Figure 1:
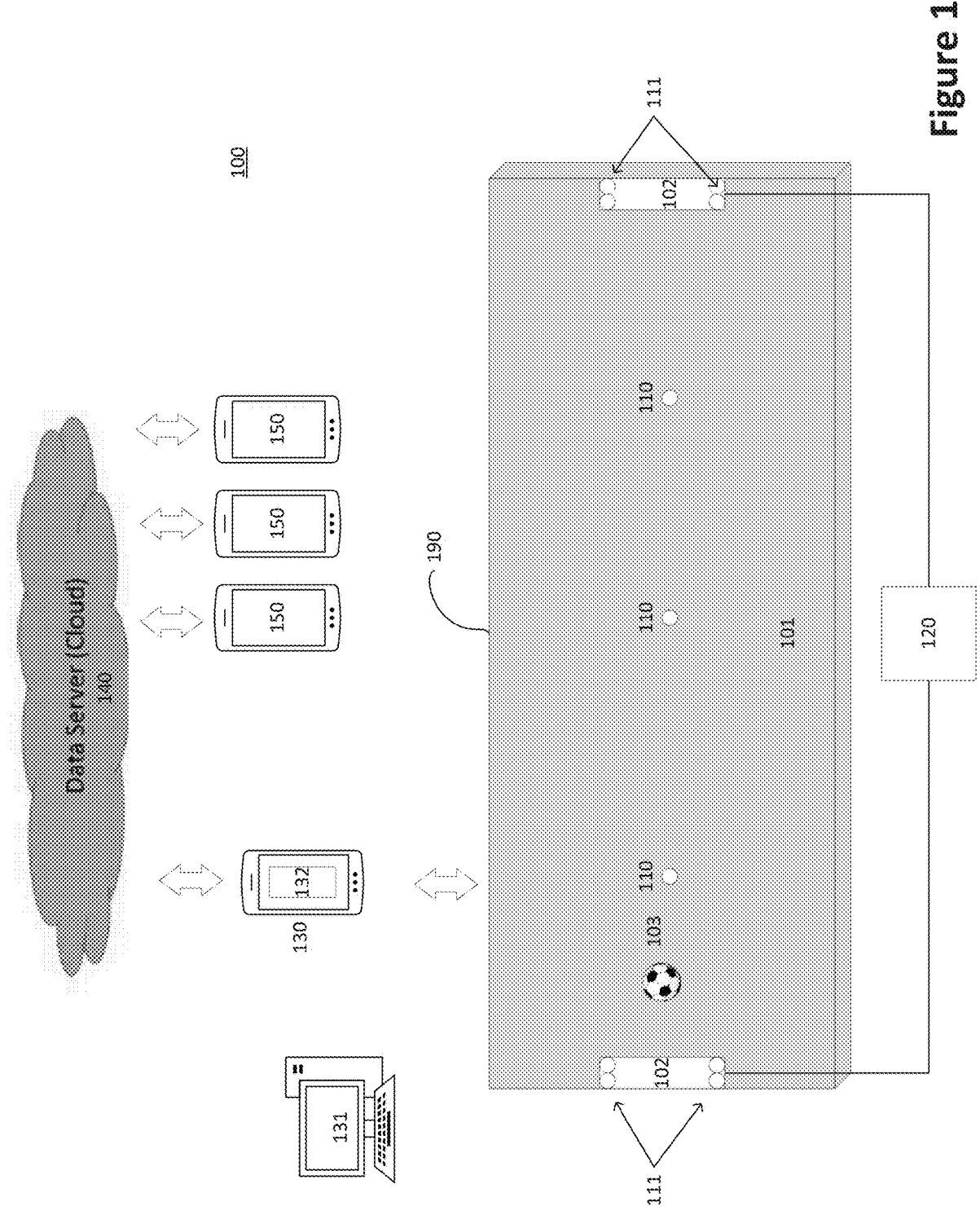
FIG. 1 illustrates an exemplary foosball table game, according to one embodiment.

It should be noted that the figures are not necessarily drawn to scale and that elements of structures or functions are generally represented by reference numerals for illustrative purposes throughout the figures. It also should be noted that the figures are only intended to facilitate the description of the various embodiments described herein. The figures do not describe every aspect of the teachings described herein and do not limit the scope of the claims.

DETAILED DESCRIPTION

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The present system described here connects a traditionally un-connected physical table game (e.g., foosball, table tennis, pool, billiards, or air hockey), having one or more sensors and a microcontroller unit, connected wirelessly to a mobile device or computing device via a Bluetooth or Wi-Fi connection, according to one embodiment. The mobile device or computing device can be connected to the internet or a data server, such as a cloud server, so that multiple users can participate as players or viewers in the game, and communicate with each other in real-time with their mobile devices, using a mobile application, for example. Data collected by sensors of the table game can be wirelessly transmitted to a mobile device or a computing device, which can process the data or communicate it with a cloud-based data server.

The connectivity between a mobile device or computing device with a table game is an improvement over prior systems because it allows multiple users, such as players or viewers, to have access to and view game data in real-time via the data server or via an internet connection, which provides users with several benefits. Benefits include having access to or viewing automated goal detection and scoring data, having access to or viewing real-time audio and video commentary, and having access to or viewing player scores and statistics, for example. Furthermore, this connectivity enables the creation of new game modes, such as a "3 minute" game mode or a speed gun shootout competition, wherein a connected application governs the duration or other fundamental aspects of the game and drives the players' behaviors.

Networking the game unit to multiple mobile devices or computing devices facilitates the creation of a larger community around a game unit, or a game session. Multiple users can "login" to a game session as players and receive real-time statistics and game information on their devices, for example. Additionally, more viewers, such as fans, can login to a game session using individualized authenticated login credentials, for example. Players and other viewers can view players' records and statistics, communicate individual comments with others. Access to real-time video and statistics allows for users, such as players, to wager against one another. Users, such as fans, may also communicate with each other and place real-time wagers on various aspects of the game. According to one embodiment, the system includes a user interface for users to view and interact with, such as a mobile application (or "app") displayed on a mobile device. The app can have numerous functionalities or displays, such as advertisements which particularly useful when games are being used by sponsors in fan engagement or brand activation campaigns, for example.

In the following description, for purposes of clarity and conciseness of the description, not all of the numerous components shown in the schematic are described. The numerous components are shown in the drawings to provide a person of ordinary skill in the art a thorough enabling disclosure of the present invention. The operation of many of the components would be understood to one skilled in the art.

Each of the additional features and teachings disclosed herein can be utilized separately or in conjunction with other features and teachings to provide the present table game. Representative examples utilizing many of these additional features and teachings, both separately and in combination, are described in further detail with reference to the attached drawings. This detailed description is merely intended to teach a person of skill in the art further details for practicing preferred aspects of the present teachings and is not intended to limit the scope of the claims. Therefore, combinations of features disclosed in the following detailed description may not be necessary to practice the teachings in the broadest sense and are instead taught merely to describe particularly representative examples of the present teachings.

Moreover, the various features of the representative examples and the dependent claims may be combined in ways that are not specifically and explicitly enumerated in order to provide additional useful embodiments of the present teachings. In addition, it is expressly noted that all features disclosed in the description and/or the claims are intended to be disclosed separately and independently from each other for the purpose of original disclosure, as well as for the purpose of restricting the claimed subject matter independent of the compositions of the features in the embodiments and/or the claims. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help understand how the present teachings are practiced but are not intended to limit the dimensions and the shapes shown in the examples.

It is appreciated that the presently described table game system or individual part(s) of the table game system may be applied to other table games or similar systems without deviating from the scope of the present subject matter.

FIG. 1 illustrates an exemplary foosball table game system 100, according to one embodiment. FIG. 1 illustrates an exemplary foosball table game 190 with field sensors 110 and goal sensors 111 in the game table 101 that detect events, according to one embodiment. The field sensors 110 detect the motion and position of a ball, and there can be goal sensors 111 near the goals 102 allowing for detection of the ball crossing the goal line, indicating the scoring of a goal. The data detected by the sensors 110 and 111 are transmitted to a microcontroller 120 for processing, in one embodiment. The microcontroller 120 can transmit the processed data via a wireless connection, such as Bluetooth or Wi-Fi, to a primary mobile device 130. In another embodiment, the data is communicated to a computer 131 via a wired or wireless connection.

According to one embodiment, the microcontroller 120 communicates with the mobile device 130 using the Bluetooth Low Energy (BLE) protocol. A service is defined that has three characteristics using the Nordic Semiconductor SDK. Characteristics define the Serial Number for the device, the current calibration of the device (table colors) and goal data (goal number, ball speed and sensors triggered). These are defined with unique UUIDs (universally unique identifier) to differentiate them from standard BLE services and characteristics. An application running on mobile device 130 uses the Rigablue BLE library to discover devices (including the microcontroller), discover services and characteristics.

The processed data is communicated from the primary mobile device 130 to a server 140, such as a cloud-based server. The server 140 allows for multiple (e.g., up to four) users to connect wirelessly from secondary mobile devices 150, and log into and participate in an instance of a game, on a specific game unit. Additional users may also connect and monitor game data, participating as spectators for example, and communicate with other users.

According to another embodiment, sensors 110 and 111 communicate wirelessly through a secondary component, such as microcontroller 120, or directly with a mobile application 132 running on mobile device 130 that manages the game mode and has multiple functionalities, such as providing sound effects and commentary to users. According to another embodiment, sensors 110 and 111 include Bluetooth chipsets to communicate with mobile device 130. In one embodiment, the mobile application 132 communicates with server 140, which can record and communicate all of the data from the game table, such as the data detected by sensors 110 and 111. If users are logged into server 140, then the server 140 can send data and messages to secondary mobile devices 150, including game event data and player statistics, for example.

In one embodiment, microcontroller unit 120 is a Rigado BMD-300 SoC with Bluetooth 4.2 (BLE) functionality. The microcontroller unit 120 can have embedded software, which calibrates sensors 110 and 111 and sets the detection thresholds so that positive detections are maximized and false detections minimized. The embedded software also can facilitate communication with primary mobile device 130. Additionally, advanced statistics can be captured by the software, such as ball speed and direction. This may be accomplished using data collected and communicated by sensors 110 and 111. The additional data, such as advanced statistics, enhances game play and can be used to train users so that users can improve their game skills.

According to one embodiment, the table game 190 has one or more field sensors 110 placed in predetermined locations in or around/under the playing field, to detect ball movement or scoring at the goals 102, also having goal sensors 111 near the goals 102. The sensors 110 and 111 generate signals upon detection of the ball in the predetermined locations in the playing field, such as electrical signals. Additional sensors may be located around the playing field. The table game 100 further includes a control circuit board containing a microcontroller 120 or microprocessor to receive and process the electrical signals from the sensors. The table game table 101 can include a control circuit board having a microcontroller or microprocessor to receive and process the electrical signals from the sensors. The control circuit board with a microcontroller or microprocessor can determine one or more events using the electrical signals provided by sensors 110 and 111, allowing for updates on game events or the game status to be communicated to users. The system described above may be integrated into the table game during manufacture or assembly of the game, or alternatively installed onto a completed table by a distributor, seller, operator or user of the game.

Figure 2:
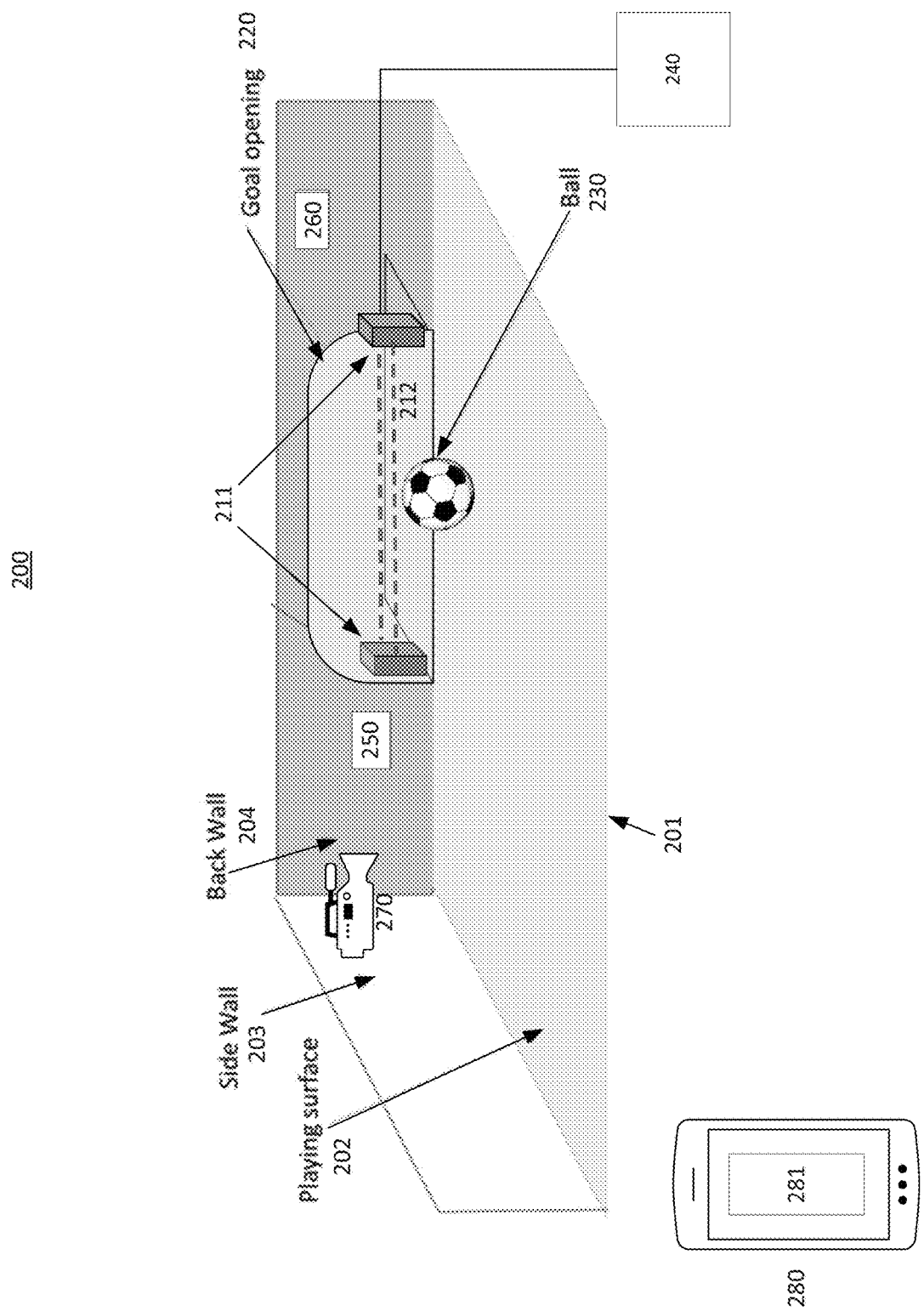
FIG. 2 illustrates an exemplary goal sensor system of a foosball table game, according to one embodiment.

FIG. 2 illustrates an exemplary goal sensor system 200 of a foosball table game, according to one embodiment. As shown in FIG. 2, an exemplary foosball table 201 has a playing surface 202, side walls 203, back walls 204, and goal opening 220, according to one embodiment. The goal opening 220 has goal sensors 211 that are used to detect the presence of a ball 230 in goal opening 220. Goal sensors 211 generate beams of light 212 across the goal opening 220, and a ball 230 is detected when it travels through the beams of light 212. In one embodiment, the goal sensor 211 consists of a phototransistor/emitter pair that is used to detect the presence of a ball 230 in the goal opening 220. Having a pair of phototransistor/emitters 211 increases the accuracy of goal detection and increases the accuracy of calculating the velocity of the ball 230. The signal detected by goal sensors 211 can be transmitted to a microcontroller unit 240 that uses thresholds to detect the ball 230 and determine the ball speed and location in the goal opening 220.

Different types of balls sensors may be used, for example a piezo vibration sensor 250, a sound (or ultrasonic) sensor 260, or a different type of light sensor. A camera 270 may also be used instead of (or to complement) one or more of the above sensors to detect the ball's position and speed. The sensors may communicate wirelessly with the microcontroller unit 240, which processes the data and communicates it to the primary mobile device 280, or directly with the mobile application 281 running on the primary mobile device 280. It is appreciated that various types of sensors, including piezo vibration sensors 250, a sound (or ultrasonic) sensor 260, and other sensing mechanisms such as capacitive sensors, contact sensors, proximity sensors, motion sensors, and accelerometers may be used without deviating from the scope of the present subject matter.

Figure 3:
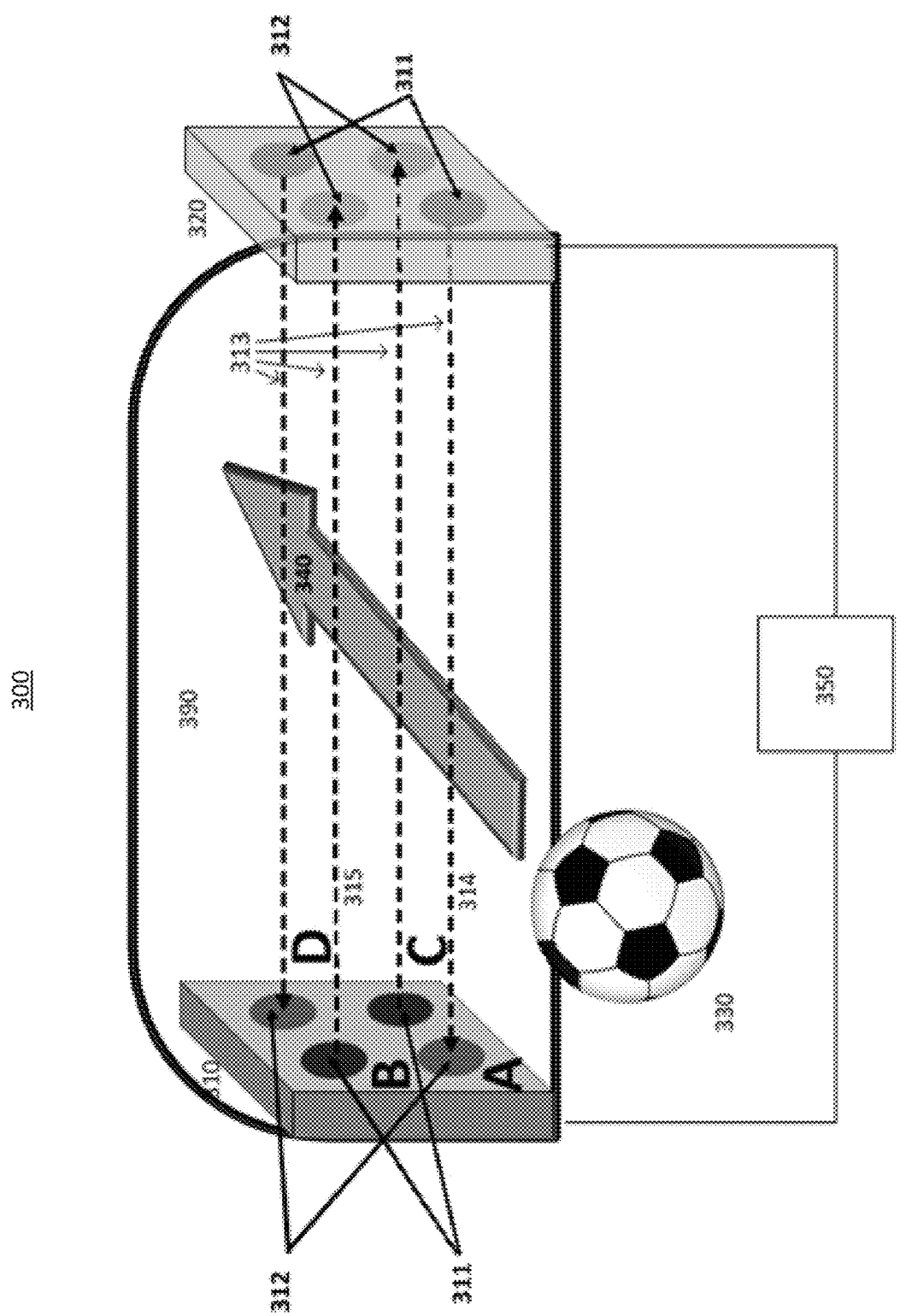
FIG. 3 illustrates a multi-beam goal sensor, according to one embodiment.

FIG. 3 illustrates a multi-beam goal sensor 300, according to one embodiment. As shown in FIG. 3, a first goal sensor module 310 and second goal sensor module 320 each contain two infrared emitters and two phototransistor sensors having LED emitters 311 that emit light beams 313 and phototransistor sensors 312 that detect light beams 313. The output voltage from sensors 312 indicates if an incident light beam 313 is disrupted, which allows for detecting the presence a ball 330 and also for determining the speed of the ball 330 as it enters the goal opening 390 in direction 340. In this embodiment, there are four light beams 313 labeled "A", "B", "C", and "D" in FIG. 3, where light beams "A" and "C" are at a lower vertical height in the goal and light beams "B" and "C" are at a higher vertical height in the goal. According to one embodiment, ball 330 disrupts light beam 313, and the disruption is detected by one of the phototransistor sensors 312. Having the ball 330 disrupt a first beam "A" 314 and then break a second beam "C" 315 increases the accuracy of goal detection, and allows for the determination of the velocity of the ball 330 with higher accuracy, for example. In one embodiment, the signal detected by first goal sensor module 310 and second goal sensor module 320 is transmitted to a microcontroller unit 350 that uses previously calibrated thresholds to determine and detect ball speed. The multi-beam system helps catch balls that enter the goal not along the surface, but elevated above the surface of the playing field.

In an alternate embodiment, first goal sensor module 310 and second goal sensor module 320 each contain one infrared emitter and phototransistor sensor having a LED emitter 311 that emits light beams 313 and one phototransistor sensor 312 that detects light beams 313. According to this embodiment, there are two light beams, labeled as "A" and "C" as depicted in FIG. 3, instead of having four light beams, as described in the alternate four sensor embodiment above. The second beam (e.g., "C") would be deeper into the goal than beam one (e.g., "A"), but at approximately the same vertical height.

Figure 4:
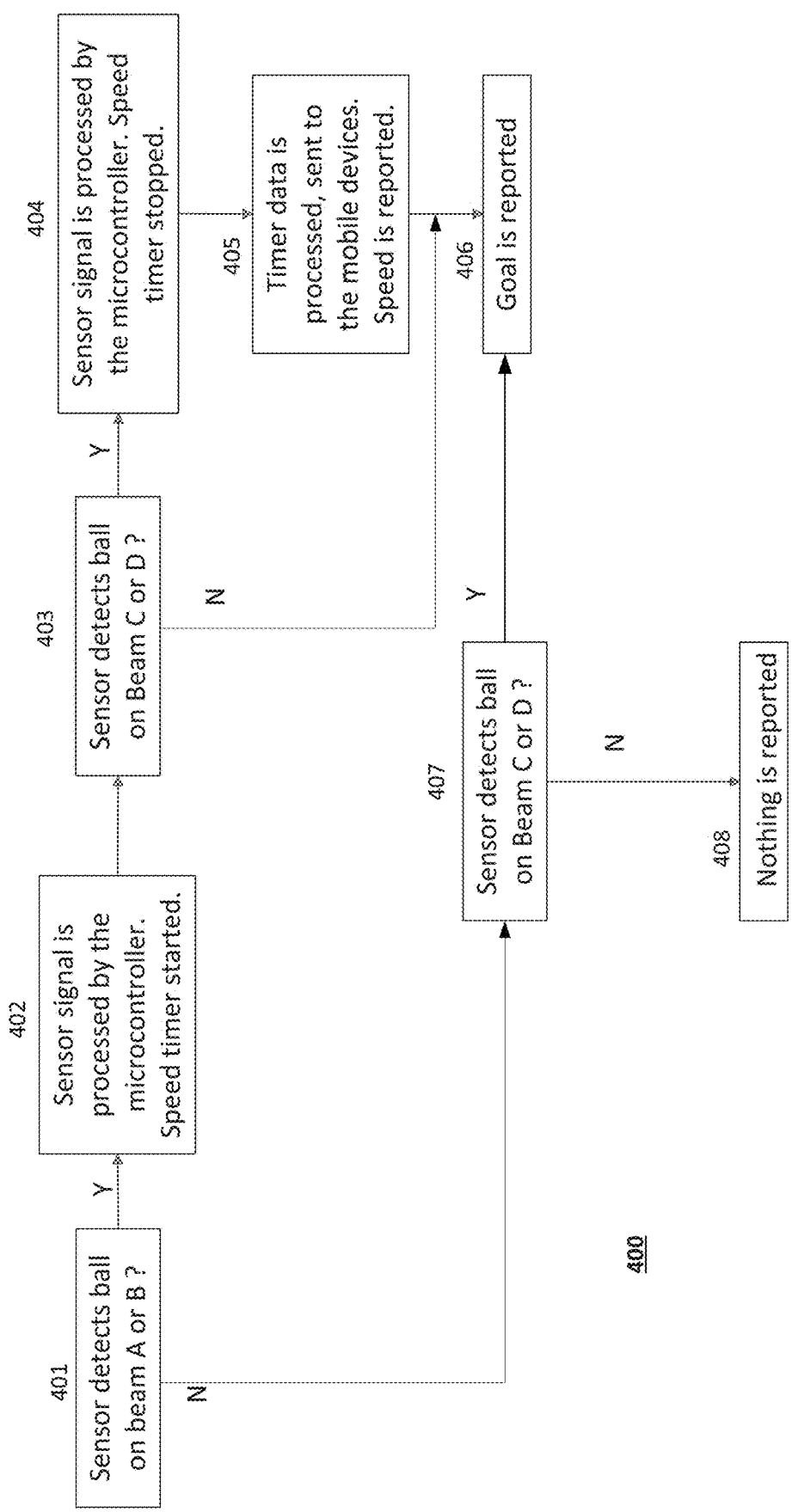
FIG. 4 is an exemplary flow chart showing a process for multi-beam sensing, according to one embodiment.

FIG. 4 is an exemplary flow chart showing a process for multi-beam sensing 400, according to one embodiment. FIG. 4 is a flowchart illustrating the process of multi-beam sensing using multiple infrared emitter and phototransistor sensor pairs on a gaming table, including detecting whether a game ball enters a goal on a gaming table. According to one embodiment, if a first goal sensor detects a ball because the ball crosses light beams A or B at 401, the sensor signal is processed by a microcontroller, and the speed timer is started, at 402. If a second goal sensor then detects a ball because the ball crosses light beams C or D at 403, the sensor signal is processed by a microcontroller, and the speed timer is stopped, at 404. The timer data is then processed, and the data can be sent to mobile devices, including the recorded speed of the ball, at 405, and a goal is reported at 406. If a second goal sensor does not detect a ball at 403 a goal is reported at 406, According to another embodiment, if a first goal sensor does not detect a ball because it does not cross light beams A or B at 401, and a second goal sensor detects a ball because it crosses light beams C or D at 407, then a goal is reported at 406. If a ball is not detected at 407, then nothing is reported at 408.

Figure 5:
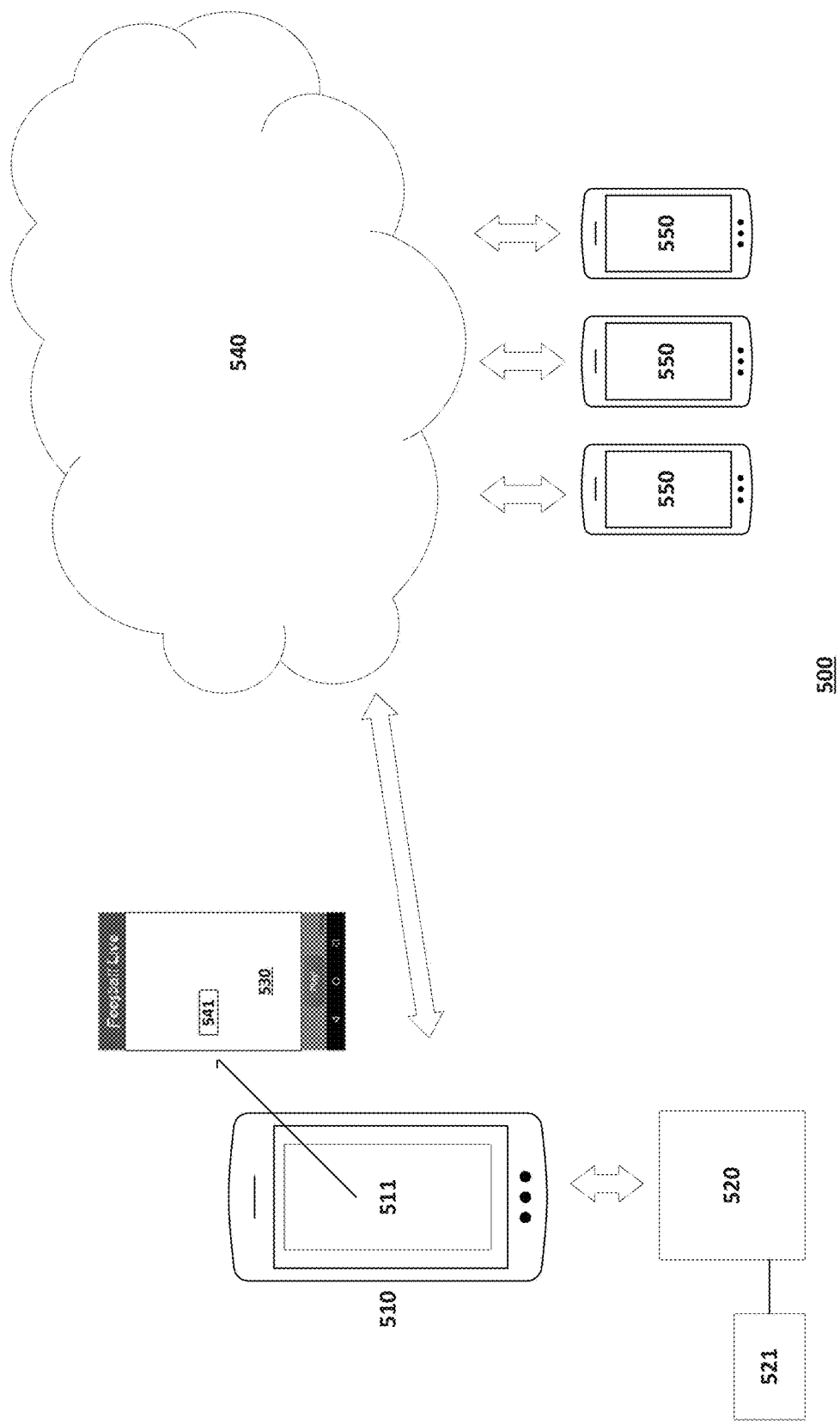
FIG. 5 illustrates an exemplary communications system for a table game system, according to one embodiment

FIG. 5 illustrates an exemplary communications system 500 for a table game system, according to one embodiment. As depicted in FIG. 5, a mobile application 511 on a primary mobile device 510 receives data from and communicates data to users that is transmitted by microcontroller unit 520 and ball sensors 521 on a game table, such as a foosball table, according to one embodiment. Mobile application 511 has a user interface 530, which has various functionalities, such as displaying game data to users, or serving as a platform for users to communicate with other users, for example. The mobile application 511 on primary mobile device 510 also can communicate with data server 540, which stores and processes games and user statistics, for example. The mobile application 511 is available for Android and iOS, for example.

In another embodiment, when the mobile application 511 is in "Team/Player Setup" mode displayed on user interface 530, data server 540 issues a unique game ID 541. According to one embodiment, the game ID 541 may be a unique team code that identifies a team playing a particular match (e.g., 831 in FIG. 8). The game ID 541 allows for other users to connect to the same instance of a game by using secondary mobile devices 550 that are in communication with data server 540.

According to one embodiment, the mobile application 511, in conjunction with data server 540 can perform the following exemplary actions: (1) process input data received from the microcontroller unit 520 and display the results and update the status of the game on user interface 530; (2) provide a calibration interface, which allows a user to specify which team is scoring into a specific goal unit; (3) communicate with data server 540, via Wi-Fi or a cellular service (e.g. 3G/4G) to store and process game and user statistics; (4) provides users the ability to create their own accounts and the ability track their near term or lifetime statistics, and compare their statistics to other players; (5) allows players to create a list of "friends", and invite these friends to a play a game; (6) provides users with the option to pick from a variety of game types, such as a 3 goal game, a timed game that lasts 5 minutes, or a penalty shootout game where the goal shot speed determines winners, for example; (7) provides a referee review icon on user interface 530, allowing users to add or subtract goals manually from either team in the event that is necessary.

According to another embodiment, data server 540 uses Python and PhP based web applications to communicate with a standard SQL-based database. Data server 540 can perform the following exemplary functions: (1) receive information from primary mobile device 510 about the status of a game table including information regarding the state of sensors 541; (2) receive game data from the primary mobile device 510, as events happen, such as a game starting or the scoring of a goal; (3) facilitate game play between multiple connected users by allowing secondary mobile devices 550 to connect into an instance of a game, with primary mobile device 510 via a real-time messaging service such as Google Cloud Messaging, which enables messages to be sent from the data server 540 to mobile application 511, and vice versa; (4) issue a unique "Game ID" 541 that allows users of secondary mobile devices 550 to log into an instance of a game on the primary device 510; (5) store and provide users with their statistics and other information relating to games in progress or games that have been completed; (6) send play-by-play data, such as scores and match statistics, to one or more secondary mobile devices 550, which communicates the status of the game to other users who are logged into the same game session; (7) perform data analysis that provides insights into game play based on various observations during a match, both at the individual player level as well as at the group and tournament levels.

Figure 6:
FIG. 6 illustrates an exemplary user interface of a mobile device in speed gun mode, according to one embodiment.

FIG. 6 illustrates an exemplary user interface screen 600 of a mobile device in speed gun mode that automatically updates when ball speed is detected, according to one embodiment. As depicted in FIG. 6, the speed gun mode 630 is displayed on a mobile device 600, which reports the speed of the goal shot, for example. The display includes the ball speed 610, the time 620, and the values are automatically updated when ball speed is detected and transmitted from a game table, according to one embodiment.

Figure 7:
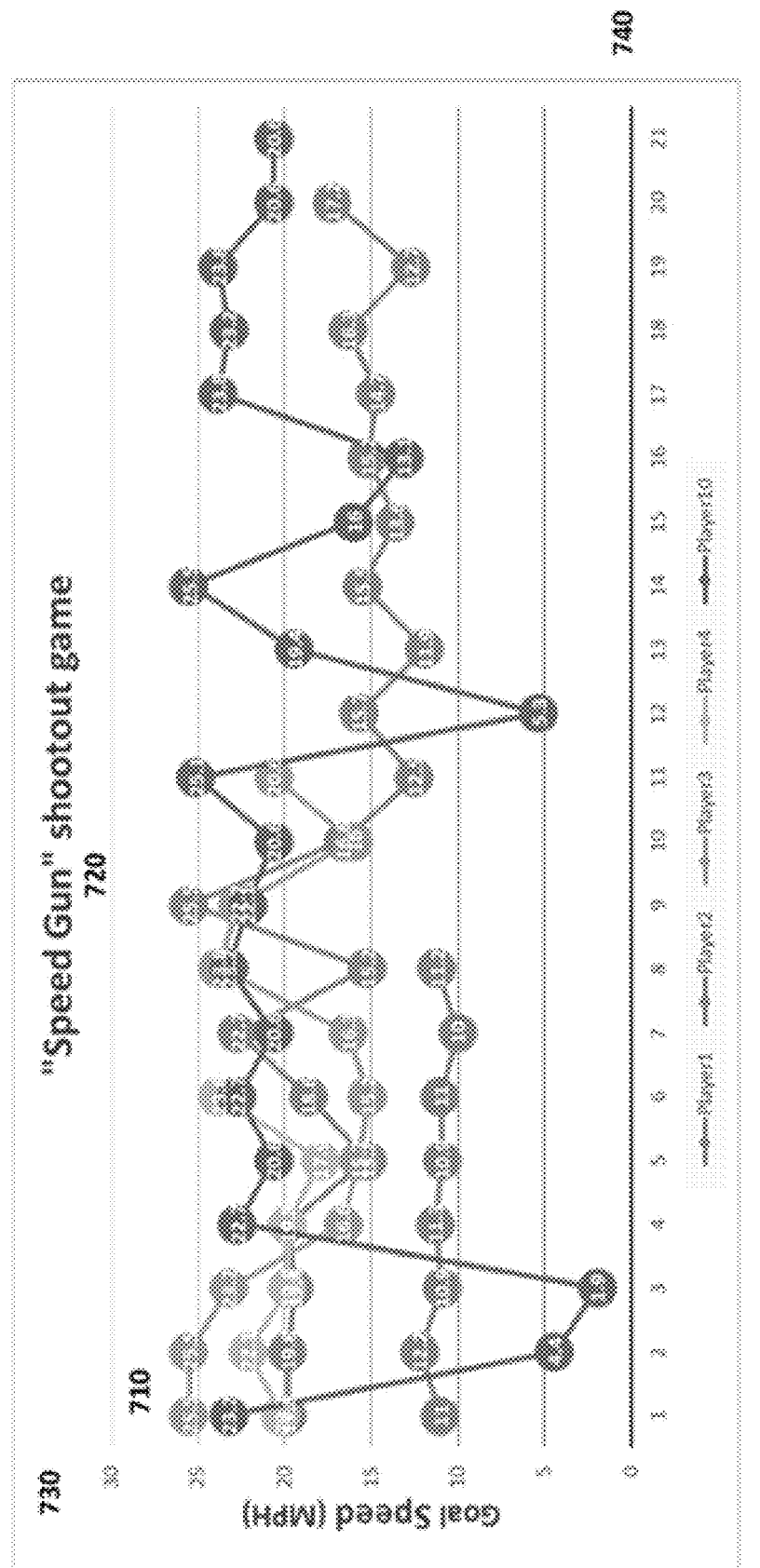
FIG. 7 is an exemplary user interface illustrating a graph of individual user speeds, according to one embodiment.

FIG. 7 is an exemplary user interface 700 illustrating a graph of individual user speeds, according to one embodiment. As shown in FIG. 7, a graph 700 is displayed of individual users' speed measurements 710 generated from game data collected during a "speed gun" shootout game mode 720. Goal speed 730 is displayed on the y-axis and goal shot number 740 is displayed on the x-axis. Winners of "speed gun" shootout game mode 720 are determined by the speed of their goal shots, according to one embodiment.

FIG. 8 is an exemplary user interface 800 illustrating a match setup screen, according to one embodiment. As shown in FIG. 8, a match setup screen 800 is displayed, according to one embodiment. The match setup screen 800 allows for multiple registered players, with one or two players on each team, representing "singles" or "doubles" respectively, and a maximum of 4 players, to login to a game session by typing in team codes 831 on their individual mobile devices or applications, after authentication from server 830. The team codes 831 are unique for a particular match. FIG. 8 shows an example "singles" match setup screen where two users 810 and 820 are logged into a game. Players who are not registered, or do not have their own mobile device or application, can enter their names via the "Add Guest" button 840. According to another embodiment displayed in FIG. 8, user interface 800 allows players who are logged in to a game to wager against one another.

FIG. 9 is an exemplary user interface 900 illustrating an exemplary scoreboard, according to one embodiment. As shown in FIG. 9, an interactive scoreboard user interface 900 is displayed, which shows the score 901, the game type 902, the time elapsed since the start of the game 903 and also provides a "referee review" button 904 that allows a user to make corrections to the displayed score. Live game updates are displayed on the scoreboard screen in user interface 900. The scoreboard screen 900 also allows for streaming of messages 910 and advertisements 920 in real-time to all or to selected game units, according to one embodiment. This is particularly useful, for example, when the games are being used by sponsors in fan engagement or brand activation campaigns.

Figure 10:
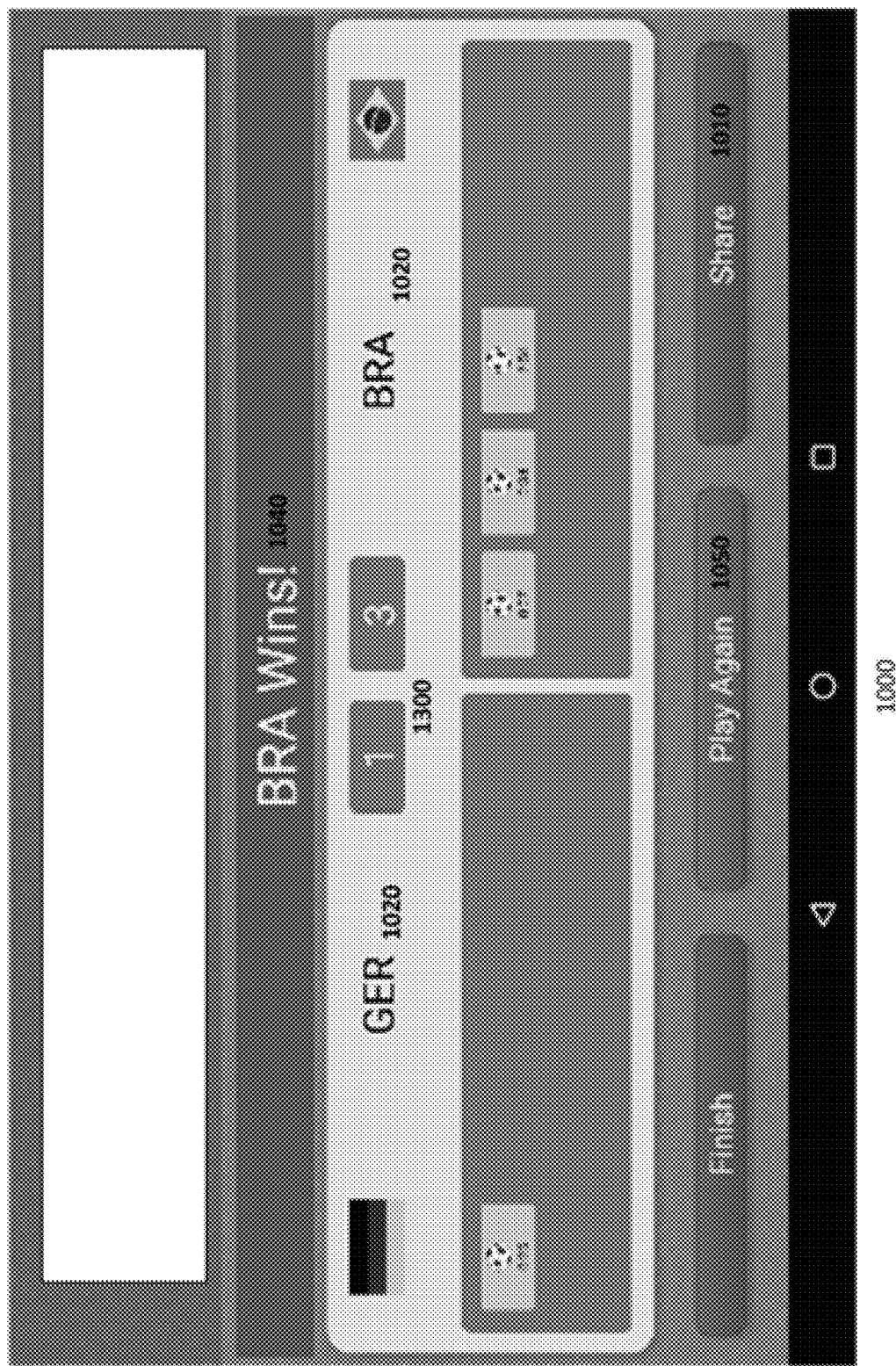
FIG. 10 is an exemplary user interface illustrating an exemplary match summary, according to one embodiment.

FIG. 10 is an exemplary user interface illustrating 1000 an exemplary match summary, according to one embodiment. As shown in FIG. 10, a match summary user interface 1000 is displayed, which provides users the ability to share game summary data on social media platforms or via e-mail by clicking the share button 1010, according to one embodiment. The match summary user interface 1000 displays team names 1020, score of the match 1030, the winner of the match 1040, and allows users to play another game with the same setup parameters by clicking "Play Again" 1050.

Figure 11:
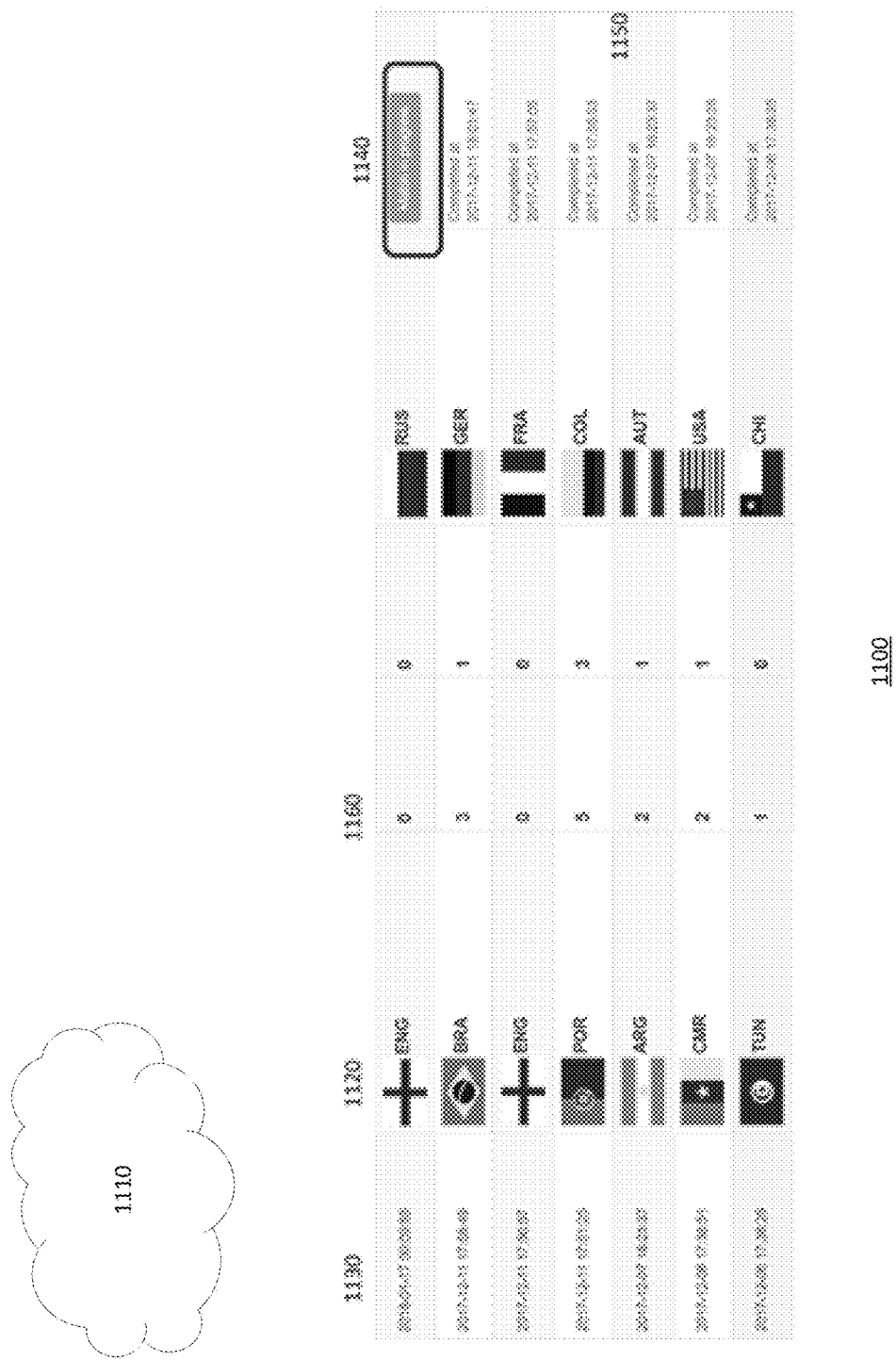
FIG. 11 is an exemplary user interface illustrating a tournament dashboard, according to one embodiment.

FIG. 11 is an exemplary user interface 1100 illustrating a tournament dashboard, according to one embodiment. As shown in FIG. 11, an exemplary tournament dashboard user interface 1100 is displayed, which provides users, via a data server 1110, with real-time updates during a game and also final results, according to one embodiment. Tournament dashboard user interface 1100 displays team names 1120, starting time and date of the match 1130, whether the match is in progress 1140, or the completion time and date of the match is completed 1150, as well as the score 1160 of the match. According to one embodiment, selecting the match in progress icon 1140 will direct the user to detailed real-time game updates, as will clicking on the match completed icon 1150, which provides users a recap of the match.

Figure 12:
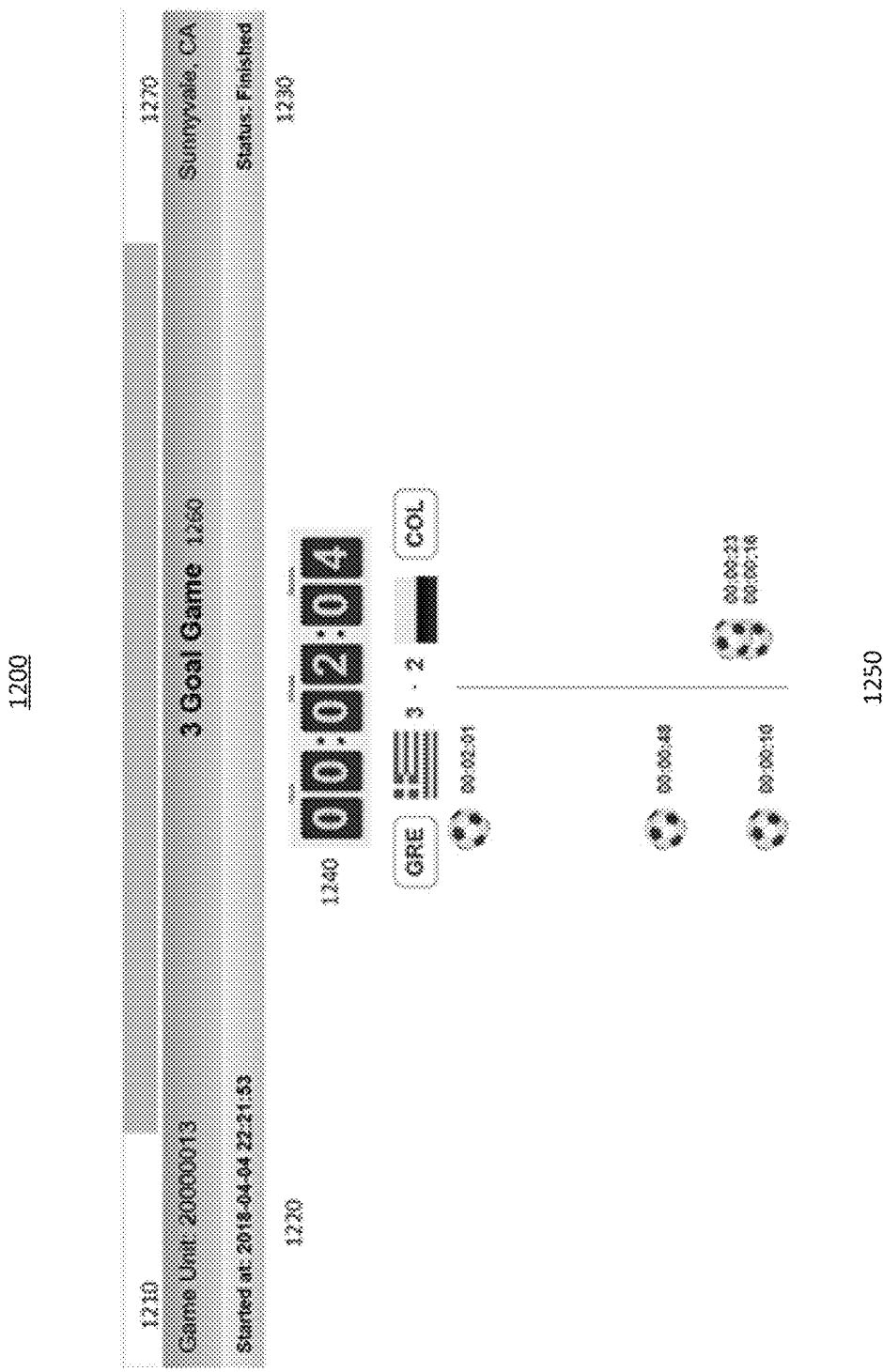
FIG. 12 illustrates an exemplary user interface of a live match, according to one embodiment.

FIG. 12 illustrates an exemplary user interface of a live match, according to one embodiment. As shown in FIG. 12, an exemplary user interface showing details of a live or concluded match 1200 is displayed, allowing for access to any viewer on the internet when provided with the proper Game Unit 1210 web address, according to one embodiment. The user interface of a live match 1200 displays an identifier of the match (game unit 1210), the match start time 1220, the match status 1230, the time elapsed of the match 1240, a timeline 1250 showing the goals scored with a timestamp, the score of the match, the type of match 1260, and the location of the match 1270. Viewers or fans can follow a game via the live scoreboard illustrated in user interface 1200. Viewers (non-playing followers) may also wager on any of the teams involved in a match. Wagers may be based on the final outcome of the game or on localized outcomes as illustrated in FIG. 12 at 1200, for example.

According to one embodiment, the present system allows for nonstandard game modes that are difficult to process manually or that require instructions to be followed. Users can log in and maintain their personal statistics and match history, such as matches won/lost or goals scored for/against, allowing for easy organization of advanced setups such as tournaments, or real-time incentives during games—for example bonus points for scoring a goal within a specified time window during a game.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. The subject matter that is intended to be within the scope of the disclosure is set forth in the following claims.

We claim:

1. A system, comprising:
    a physical table game having a first goal, wherein a physical match is played on the physical table game;
    a first sensor inside the first goal;
    a microcontroller of the physical table game in communication with the first sensor that collects first data and detects when a ball has entered the first goal;
    a computing device in communication with the microcontroller, wherein the computing device captures video clips of the physical match; and
    a remote server in communication with the computing device,
        wherein the remote server receives the first data collected by the microcontroller of the physical table game, and
        wherein the remote server publishes advertisements to the computing device for display during the physical match and in the captured video clips thereof.

2. The system of claim 1, further comprising an application running on the computing device that processes the first data received from the microcontroller and displays a status of the physical match being played on the physical table game.

3. The system of claim 2, further comprising:
    a second goal; and
    a second sensor inside the second goal; wherein the microcontroller is in communication with the second sensor and collects second data; and wherein the microcontroller detects when a ball has entered the second goal.

4. The system of claim 3, wherein the remote server stores and processes the first data and the second data.

5. The system of claim 3, wherein the first data and the second data are used with an electronic wagering system.

6. The system of claim 5, wherein the system streams updates of the physical match to facilitate wagers between viewers.

7. The system of claim 2, wherein the remote server processes wagers relating to the physical match.

8. The system of claim 1, wherein the remote server maintains user accounts and tracks statistics for a user from a plurality of physical table games.

9. The system of claim 8, wherein the remote server maintains a friend list for the user, wherein the friend list comprises friends who are engaging with a game and those who are not.

10. The system of claim 8, wherein the remote server allows multiple users to log in to the physical match as either a player or a viewer and provides real-time updates on the physical match.

11. The system of claim 8, wherein the remote server communicates with a social media server to provide the real-time updates on the physical match for publication to an account on the social media server.

12. The system of claim 11, wherein the video clips of the physical match as captured by the computing device are published to the social media server.

13. The system of claim 1, wherein the computing device provides an option to select a game type.

14. The system of claim 13, wherein the game type includes one or more of a single match, a tournament, a round robin tournament, a single elimination tournament, and a duration.

15. The system of claim 13, wherein the remote server determines tournament standings according to the game type.

16. The system of claim 13, wherein the game type includes user defined games.

17. The system of claim 1, wherein the remote server receives status information from the microcontroller, wherein the status information relates to a state of the first sensor.

18. The system of claim 1, further comprising a plurality of secondary computing devices that communicate with the remote server to receive real-time updates based on the first data and the second data.

19. The system of claim 1, wherein the microcontroller calculates a speed of the ball as it enters the first goal.

20. The system of claim 1, wherein the microcontroller calculates a position of the ball inside the first goal.

* * * * *